Sept. 29, 1970  R. M. LAMB  3,530,950
TURNABLE RUNNER STEERED VEHICLE
Filed Jan. 24, 1968  5 Sheets-Sheet 1

INVENTOR
ROBERT M. LAMB
BY *J. A. Sergint*
ATTORNEY

Sept. 29, 1970 R. M. LAMB 3,530,950
TURNABLE RUNNER STEERED VEHICLE
Filed Jan. 24, 1968 5 Sheets-Sheet 3

United States Patent Office 3,530,950
Patented Sept. 29, 1970

3,530,950
TURNABLE RUNNER STEERED VEHICLE
Robert M. Lamb, 915 Oswego St.,
Liverpool, N.Y. 13088
Filed Jan. 24, 1968, Ser. No. 700,070
Int. Cl. B62m 27/00
U.S. Cl. 180—5
9 Claims

ABSTRACT OF THE DISCLOSURE

A snowmobile is equipped with two front runners, each attached to an upwardly extending steering spindle. Each spindle is slanted forwardly and laterally outwardly towards its lower end and has a pin at its lower end to which its runner is swivelly attached, the runner being positioned below the pin to rock in a fixed plane relative to the swivel pins. The pins extend laterally in alignment when the runners are directed straight forward. Turning the runners causes them to be pitched over to the outer side on the turning curve and to bank, matching the motion of a person on skis. Steering stability results.

This invention relates to an iced terrain travel vehicle having two parallel steering runners mounted on the vehicle for turning. It is specially applicable to a snowmobile, a vehicle in which a single, motor driven, flexible belt forming an endless track supports most of the weight, the runners being positioned to support sufficient weight to turn the vehicle when it is steered to right or left.

A principal object of the invention is to provide a structure which causes the runners to be pitched over to the outer side of the turning curve when the vehicle turns and also causes them to bank, thus to stabilize the vehicle against turnover, and make possible a sharper turn without forward skid of the runners.

A further object of the invention is to locate the runners further apart on the vehicle, thus to add stability against turnover, maintaining, however, a close distance apart of the upper ends of the linked together steering spindles, thus not to enlarge the cowl, all connecting linkages from the handle bar to the spindles being maintained within the cowl.

A further object is to make adjustable the distance of the runners apart and their bearing on the terrain.

For a description in detail of the invention reference is made to the accompanying drawing in which.

Figure 8:
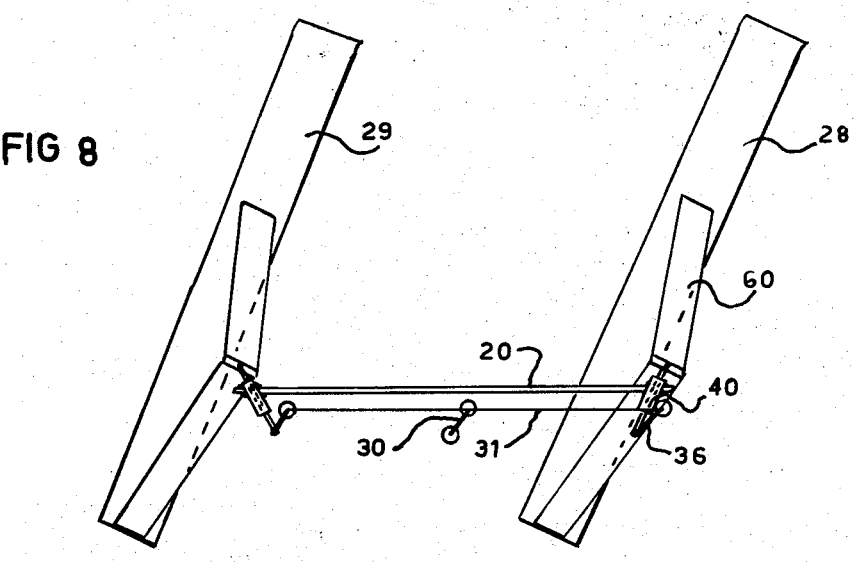
Figure 7:
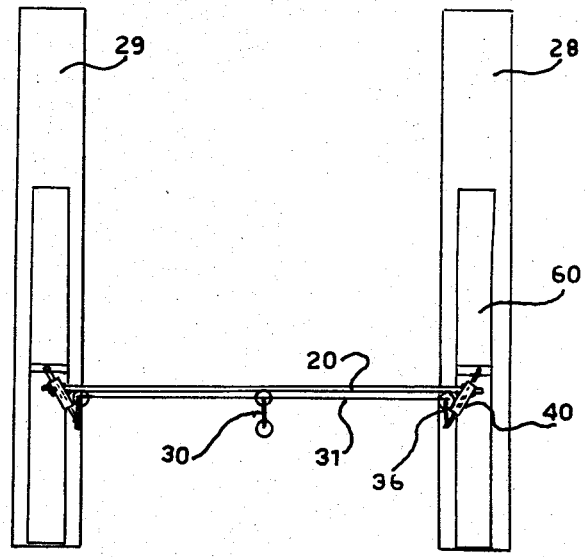
Figure 9:
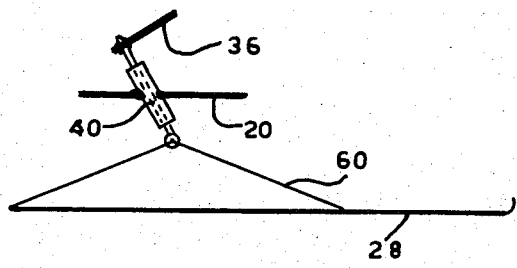
Figure 10:
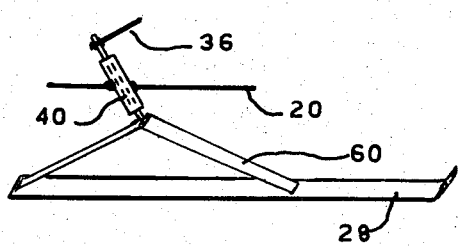
Figure 11:
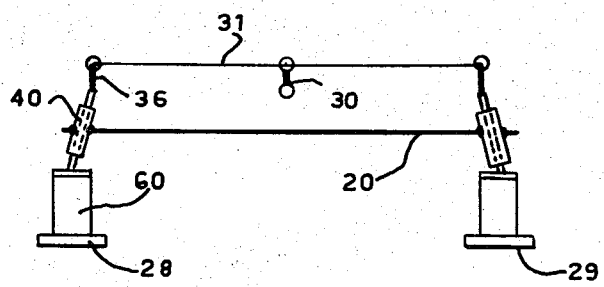
Figure 12:
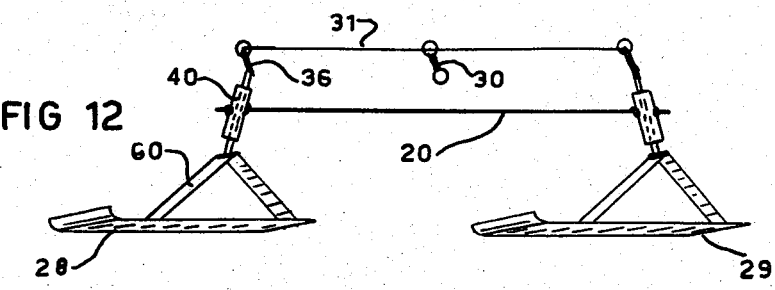

FIGS. 7 through 12 are schematic views to illustrate the movement of the runners on making a turn; FIG. 7 being a plan view with the runners directed straight forward; FIG. 8 being a similar view making a right turn; FIG. 9 being a right hand side elevation of FIG. 7; FIG. 10 being a right hand side elevation of FIG. 8; FIG. 11 being a front elevation of FIG. 7, and FIG. 12 being a front elevation of FIG. 8.

The vehicle has an integral frame and body 20, flexible endless track 21, driven by a conventional motor (not shown), steering column 22, handle bars 23, and a cowl 24 attached to the frame on a flange 25.

The two runners 28 and 29 and their mounting are similar, and only runner 28 and its associated parts will be described in detail.

The steering column 22 has a steering column arm 30 fixed to it. A covenntional steering link 31 provided with ball joint ends 32 and 33 is coupled by joint 32 to the arm 30 and by joint 33 to a steering spindle arm 36 horizontally adjustably and nonrotatably attached to the steering spindle 37 by means of a key 38 and clamp bolt 39.

Spindle 37 is mounted to turn in a sleeve 40 which is fixed to the frame 20 by welding to support plates 41 and 42, the plates being welded to the frame. The sleeve is positioned on the frame in such manner that the spindle turning axis projects forwardly from the vertical at its lower end and also projects laterally outwardly.

Figure 1:
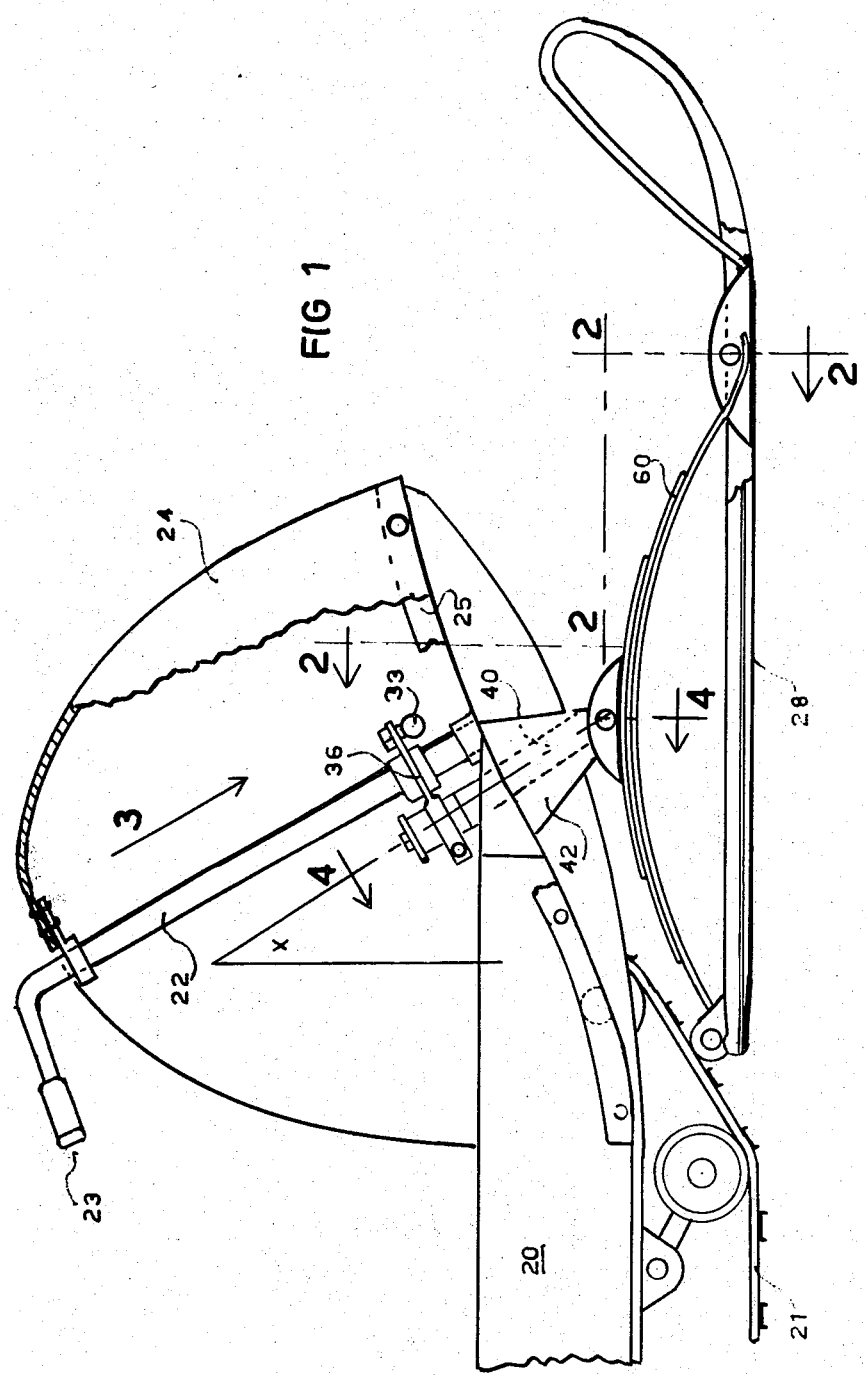
FIG. 1 is a side elevation of the front end of the vehicle with broken away parts.
Figure 2:
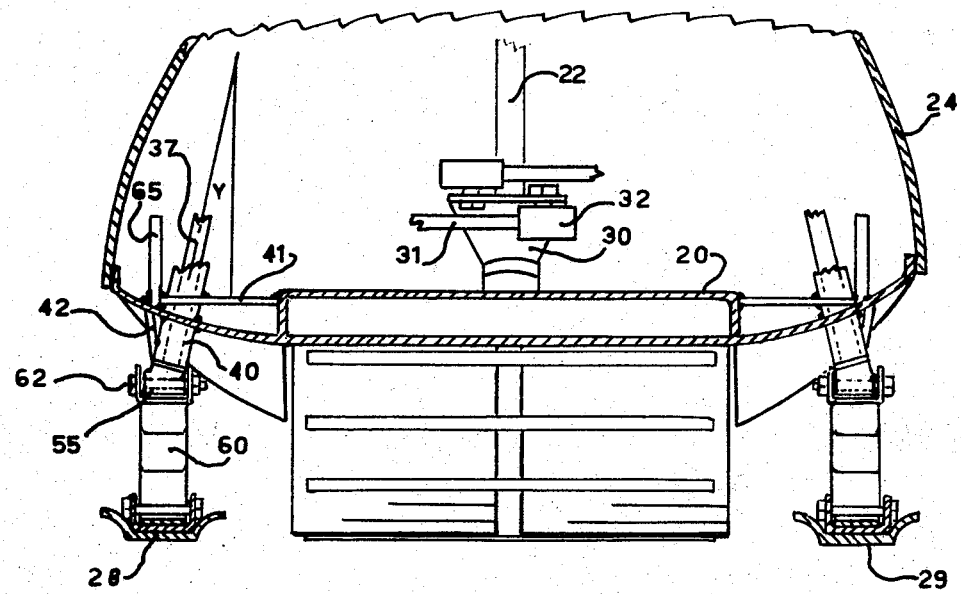
FIG. 2 is a section on the line 2—2 of FIG. 1 with broken away parts.
Figure 3:
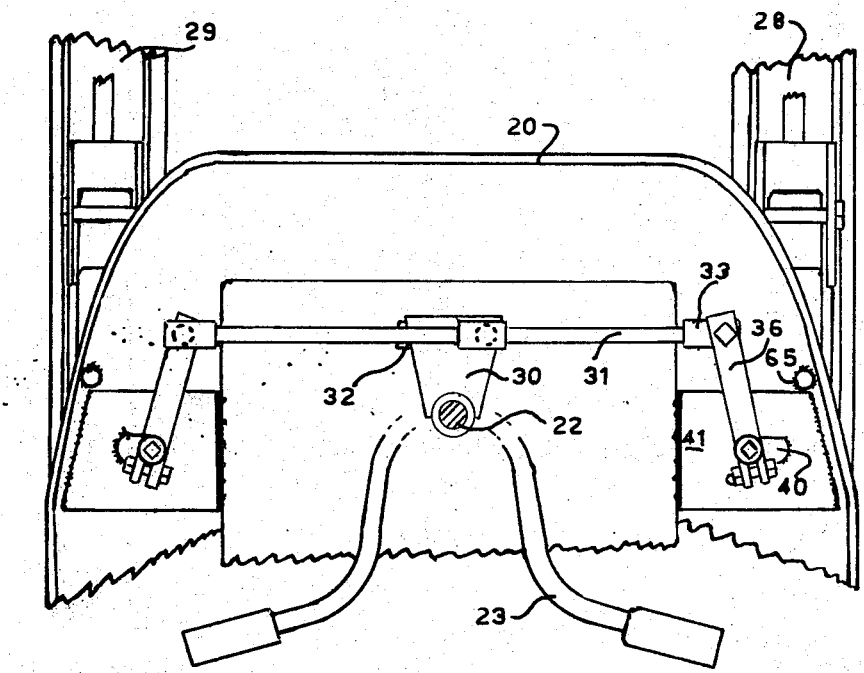
FIG. 3 is a view in the direction of Arrow 3 of FIG. 1.
Figure 4:
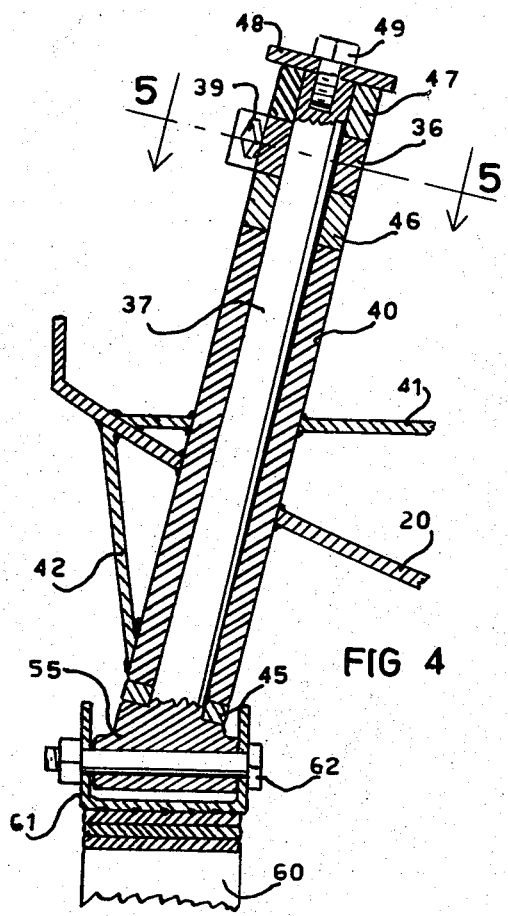
FIG. 4 is an enlarged section on the line 4—4 of FIG. 1.
Figure 5:
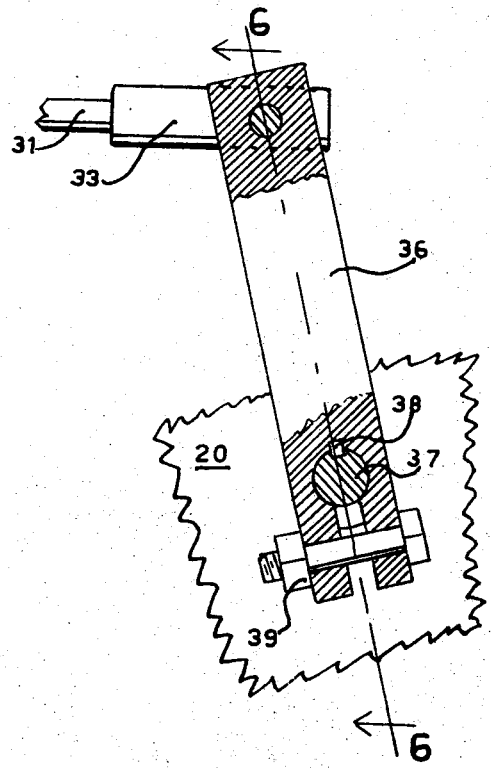
FIG. 5 is a section on the line 5—5 of FIG. 4.
Figure 6:
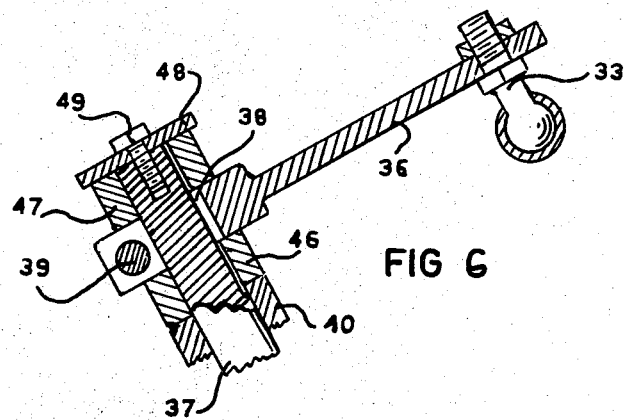
FIG. 6 is a section on the line 6—6 of FIG. 5.

Angle Y in FIG. 2 represents the acute angle that the spindle axis makes with the vertical, the angle that the spindle axis is inclined from the vertical towards the lateral side of the vehicle. Angle X of FIG. 1 represents the acute angle that the spindle makes with the vertical, the angle of forward projection of the lower end.

Spindle 37 is mounted in sleeve 40 with collars 45, 46 and 47 of varying widths fitting loosely on the spindle, the collar 47 being held on by washer 48 and stud bolt 49. Selectively changing positions of the collars will vary the longitudinal position of the spindle on the vehicle frame, to illustrate, placing collars 46 and 47 on the spindle in position with collar 45 below the lower end of the sleeve, and resetting arm 36 to the extreme upper end of the spindle would place the runner 28 in its furtherest outward position and in its greatest weight bearing adjustment.

Spindle 37 is provided at its lower end with an integral, swivel pin bearing sleeve 55.

The runner 28, of a usual design is provided with a leaf spring 60 attached at its ends to the runner and a clevis 61 secured to the spring at its central portion. Swivel pin 62 mounts the clevis to sleeve 55 so that the runner rocks below in a plane fixed relative to the swivel pin.

The sleeve 55 is integrated on the spindle 37 at such an angle that when the runners are directed straight forward the axes about which the runners swivel are aligned horizontally, and the runners ride essentially flat on the terrain.

Referring to FIGS. 7 and 8, representing the making of a right turn, both runners 28 and 29 are pitched over to the left, or the outer side of the turning curve, as the turn from straight ahead to right is effected. They also bank into the snow. The banking diminishes the tendency of the runners to skid forward, making sharper turning possible. The pitching over of the outside runner 29 throws its fulcrum on the snow further out from the vehicle, making sharper turning possible without overturning the vehicle. Better stability and maneuverability at higher speeds result.

The same pattern of operation follows the making of a left-hand turn.

When the vehicle travels, especially when hard objects such as snow buried logs, or rocks, are encountered, a considerable rearward force is imparted to the runner. The forward projection causes the resultant thrust to be imparted more directly in line with the spindle, diminishing the canting strains of the spindle in its bearing sleeve.

The banking motion of the runners results primarily from the outward projection angle of the spindle. As the vehicle turns the weight is thrown towards the outside of the turn curve. The outer runner (runner 29 in FIG. 8, for instance) takes a heavy load. The resultant thrust is imparted more directly in line with the spindle than if it were not angled outwardly, further to avoid canting strains of the spindle.

The arrangement shown is such that during the turning movement of the vehicle the runner on the inside of the turning curve assumes a sharper turning angle than the runner on the outside. Thus the inner runner follows the shorter turning curve while the outer runner follows the longer curve. Also, due to the pitching over of the runners, the front of the vehicle lowers a little when the runners are turned. Thus a slightly greater manual steering effort is required to bring the vehicle from a turning to a forward motion.

Although the angles X and Y may be varied, I have found the values of 30 to 35 degrees for X, and 10 to 15 degrees for Y satisfactory. These values I used with a snowmobile having an overall length of about 9 feet, an 18-inch wide track, and a 42-inch long, 5-inch wide runner.

The larger the angle Y the more the runners will pitch over. The upper limit on the angle is that practical for the vehicle to obtain a desired steering stability without resulting in making it undesirably difficult to return the runners from a turning to a forward position, and also to keep the runners low enough during turning maneuvers to support a sufficient amount of the snowmobile weight.

What is claimed is:

1. An iced terrain vehicle having two steering spindles linked together to turn simultaneously, each spindle being attached to the vehicle to turn about on an axis inclined at an acute angle from the vertical toward a lateral side of the vehicle such that the lower end of the spindle and the turning axis projects laterally outwardly from the vehicle, a runner swivally attached to the lower end of each spindle to rock below it in a plane fixed relative to the swivel axis of the runner, the swivel axis of each runner being at an angle to its turning axis such that the swivel axes of the runners are in substantial alignment when the runners are positioned for direct forward movement of the vehicle, whereby upon turning the spindles and runners to steer the vehicle either to right or left the runners are pitched over toward the outside of the turning curve and are banked.

2. The vehicle of claim 1 in which each spindle is attached to the vehicle with its turning axis at an acute angle from the verticle such that the lower end of the spindle and its turning axis projects forwardly also.

3. The vehicle of claim 2 in which the angle of outward projection is from 10 to 15 degrees and the angle of forward projection is from 30 to 35 degrees.

4. The vehicle of claim 1 in which the angle of outward projection is from 10 to 15 degrees.

5. The vehicle of claim 1 in which the attachment of the runner to its spindle comprises a leaf spring, the ends of the spring being attached to the runner and the spring being secured at its central portion to the spindle.

6. The vehicle of claim 1 in which the spindles are longitudinally adjustably attached to the vehicle, whereby the distance apart of the runners and their bearing on the terrain may be varied.

7. The vehicle of claim 1 in which a single, motor driven, flexible belt forming an endless track supports most of the weight of the vehicle, the runners being positioned to support sufficient weight to turn the vehicle when it is steered, and in which the spindles are longitudinally adjustably attached to the vehicle, whereby the distance apart of the runners and their bearing on the terrain may be varied.

8. The vehicle of claim 7 in which each spindle is swivelly mounted in a sleeve fixed to the vehicle and collars fitting loosely on the spindle may be selectively mounted on the spindle below the lower end of the sleeve to effect the longitudinal adjustment of the spindle.

9. An iced terrain vehicle comprising a frame, two steering spindles, each spindle being attached to the frame to turn about on an axis inclined at an acute angle from the vertical toward a lateral side of the vehicle such that the lower end of the spindle and the turning axis project laterally outwardly from the vehicle, a linkage connecting the end portions of the spindles above the frame to turn them simultaneously for steering the vehicle, a runner swivally attached to the lower end of each spindle to rock below it in a plane fixed relative to the swivel axis of the runner, the swivel axis of each runner being at an angle to its turning axis such that the swivel axes of the runners are in substantial alignment when the runners are positioned for direct forward movement of the vehicle, whereby upon turning the spindles and runners to steer the vehicle either to the right or left the runners are pitched over toward the outside of the turning curve and are banked, and a cowl attached to the frame containing the upper ends of the spindles and the linkage.

References Cited

UNITED STATES PATENTS

| | | | |
|---|---|---|---|
| 2,346,351 | 4/1944 | Bombardier | 280—16 X |
| 2,702,088 | 2/1955 | Klimek | 180—5 |
| 2,970,662 | 2/1961 | Hetteen | 180—5 |
| 3,173,703 | 3/1965 | Isenberger | 280—21 |
| 3,213,955 | 10/1965 | Hetteen | 280—21 X |
| 3,437,354 | 4/1969 | Hetteen | 280—415 |
| 3,480,096 | 11/1969 | Hammitt | 180—5 |

RICHARD J. JOHNSON, Primary Examiner

U.S. Cl. X.R.

280—21